US012134988B2

(12) United States Patent
Brillon et al.

(10) Patent No.: US 12,134,988 B2
(45) Date of Patent: Nov. 5, 2024

(54) ACCESSORY GEARBOX COVER WITH PLANAR LINKING MEMBER

(71) Applicant: PRATT & WHITNEY CANADA CORP., Longueuil (CA)

(72) Inventors: Louis Brillon, Varennes (CA); Mateusz Kesek, Nagawczyna (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/154,134

(22) Filed: Jan. 13, 2023

(65) Prior Publication Data

US 2024/0240592 A1     Jul. 18, 2024

(51) Int. Cl.
*F02C 7/32*     (2006.01)
*F02C 7/25*     (2006.01)
(Continued)

(52) U.S. Cl.
CPC .................. *F02C 7/32* (2013.01); *F02C 7/25* (2013.01); *F16H 57/028* (2013.01);
(Continued)

(58) Field of Classification Search
CPC ...... F02C 7/24; F02C 7/25; F02C 7/32; F16H 57/025; F16H 57/028; F16H 57/03;
(Continued)

(56) References Cited

U.S. PATENT DOCUMENTS

| 4,908,008 A * | 3/1990 | Gorski .................. F16P 1/02 474/146 |
| 6,298,962 B1 | 10/2001 | Kato et al. |

(Continued)

FOREIGN PATENT DOCUMENTS

| DE | 102020120061 | 2/2022 |
| EP | 3000992 | 3/2016 |

OTHER PUBLICATIONS

European Search Report issued on Jun. 10, 2024 for EP application No. 24151968.5.
(Continued)

*Primary Examiner* — Alain Chau
(74) *Attorney, Agent, or Firm* — NORTON ROSE FULBRIGHT CANADA LLP

(57) ABSTRACT

An accessory gearbox of an aircraft engine includes a cover mounted thereto. The cover defines a centrally extending axis and has an outer surface with accessory mounts disposed thereon. First and second accessory devices are mounted to the gearbox at first and second mounts spaced apart on the cover. A planar linking member dynamically couples the first accessory device to the second accessory device. The linking member extends transversally relative to the axis and has a first side opposite a second side with a first opening extending therethrough. The first opening is aligned and matingly receiving at least a portion of the first accessory device therethrough. The linking member has a second opening extending therethrough. The second opening is aligned and matingly receiving at least a portion of the second accessory device therethrough. The linking member mechanically interconnects the first and second accessory devices independently from the cover.

17 Claims, 4 Drawing Sheets

(51) Int. Cl.
*F16H 57/028* (2012.01)
*F16H 57/031* (2012.01)

(52) U.S. Cl.
CPC ....... *F16H 57/031* (2013.01); *F05D 2260/30* (2013.01); *F05D 2260/96* (2013.01)

(58) Field of Classification Search
CPC ............... F16H 57/031; F05D 2260/30; F05D 2260/96; F05D 2260/642; F01D 25/28
See application file for complete search history.

(56) References Cited

U.S. PATENT DOCUMENTS

| | | | |
|---|---|---|---|
| 6,357,220 B1* | 3/2002 | Snyder | F02C 7/32 |
| | | | 60/226.1 |
| 9,352,649 B2* | 5/2016 | Viel | F02C 7/32 |
| 9,605,562 B2 | 3/2017 | Bettagere et al. | |
| 9,765,696 B2 | 9/2017 | Beier et al. | |
| 10,526,915 B2* | 1/2020 | Suciu | F01D 25/20 |
| 10,767,749 B2* | 9/2020 | Duong | F16H 57/025 |
| 11,060,599 B2* | 7/2021 | Duong | F16H 57/033 |
| 11,440,669 B2 | 9/2022 | Buchholz | |
| 2008/0127774 A1 | 6/2008 | Frost | |
| 2014/0130628 A1* | 5/2014 | Abousleiman | F01D 25/162 |
| | | | 74/412 R |
| 2014/0150575 A1* | 6/2014 | Viel | F02C 7/32 |
| | | | 74/15.63 |
| 2016/0201789 A1* | 7/2016 | Duong | F16H 57/025 |
| | | | 74/606 R |
| 2016/0230601 A1 | 8/2016 | Bettagere et al. | |
| 2017/0089444 A1* | 3/2017 | Meunier | C23C 4/18 |
| 2017/0254219 A1* | 9/2017 | Suciu | F04D 27/009 |
| 2017/0356347 A1* | 12/2017 | Scothern | F02C 7/06 |
| 2018/0266263 A1* | 9/2018 | Jacon | F16J 15/4476 |
| 2020/0109668 A1* | 4/2020 | Butcher | F02C 7/04 |
| 2022/0055756 A1* | 2/2022 | Basse | F02C 7/25 |

OTHER PUBLICATIONS

European Search Report issued on Jun. 28, 2024 for EP application No. 24150261.6.

* cited by examiner

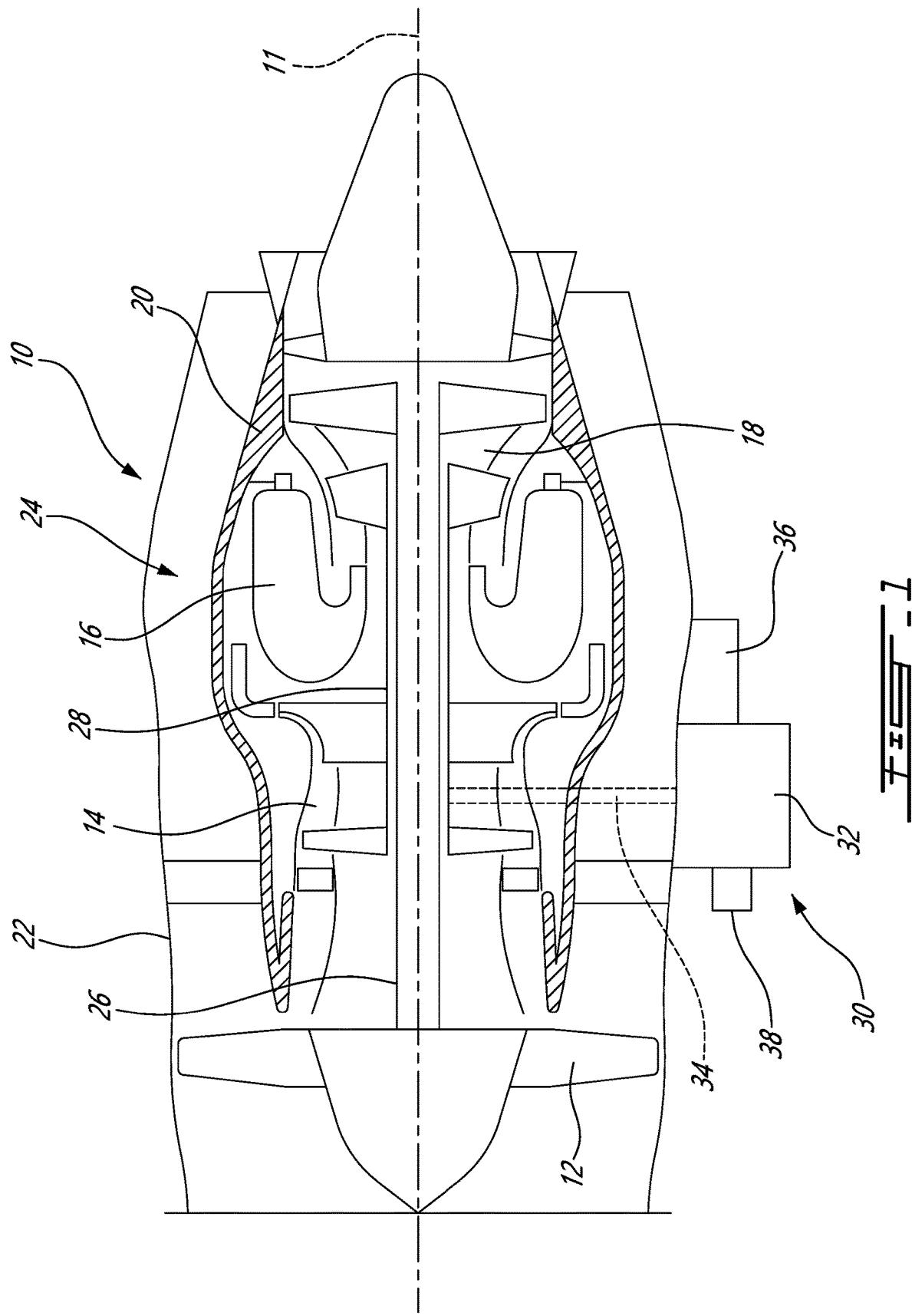

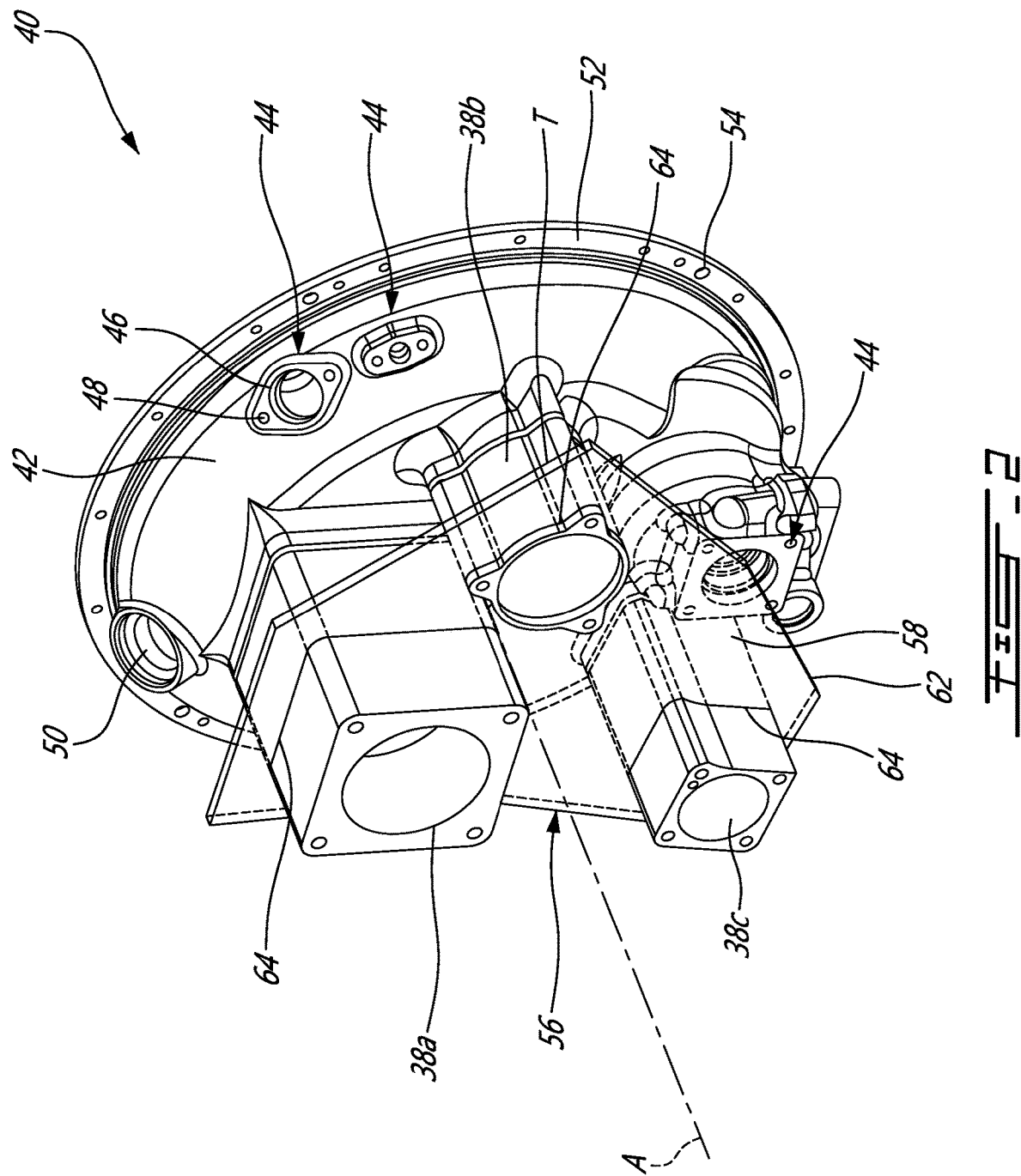

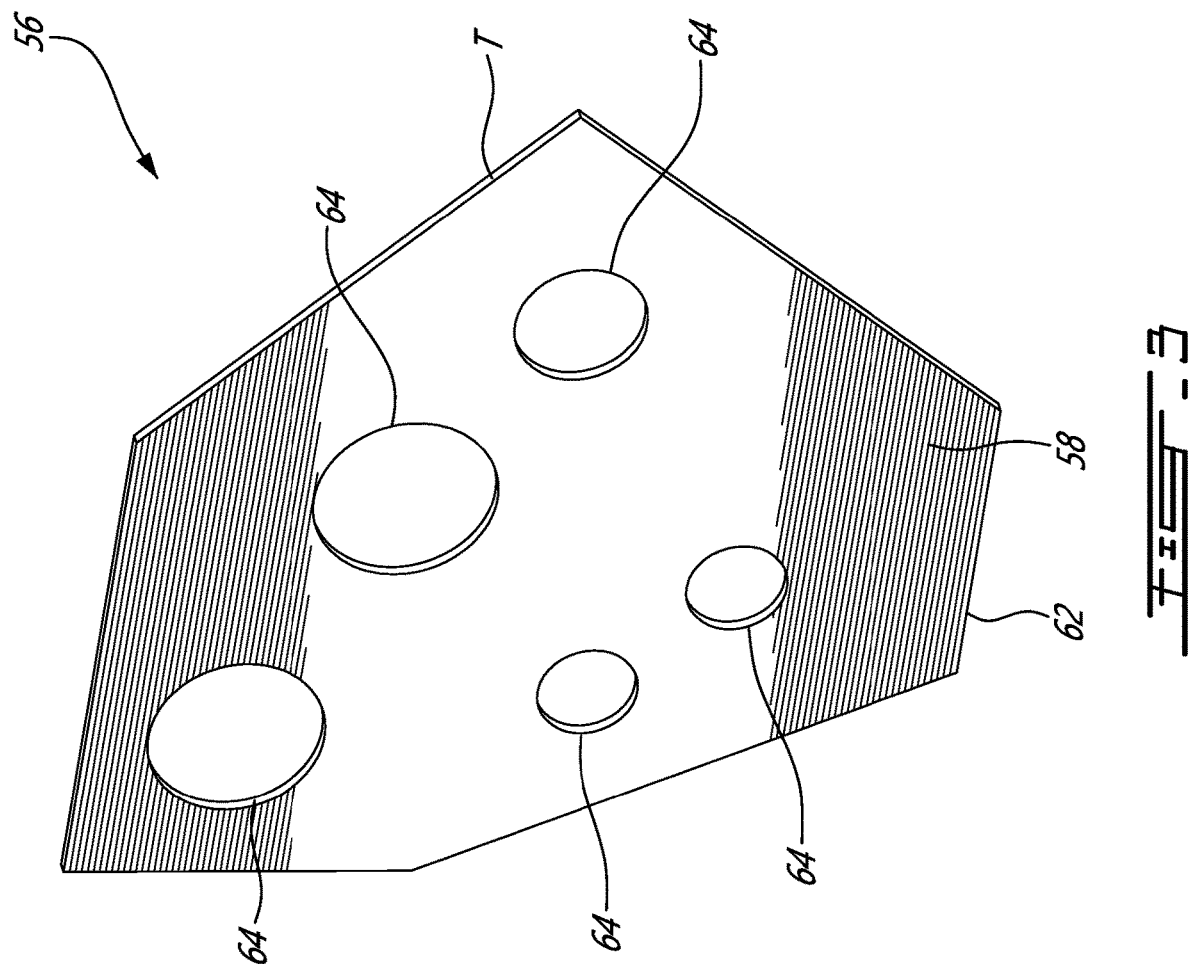

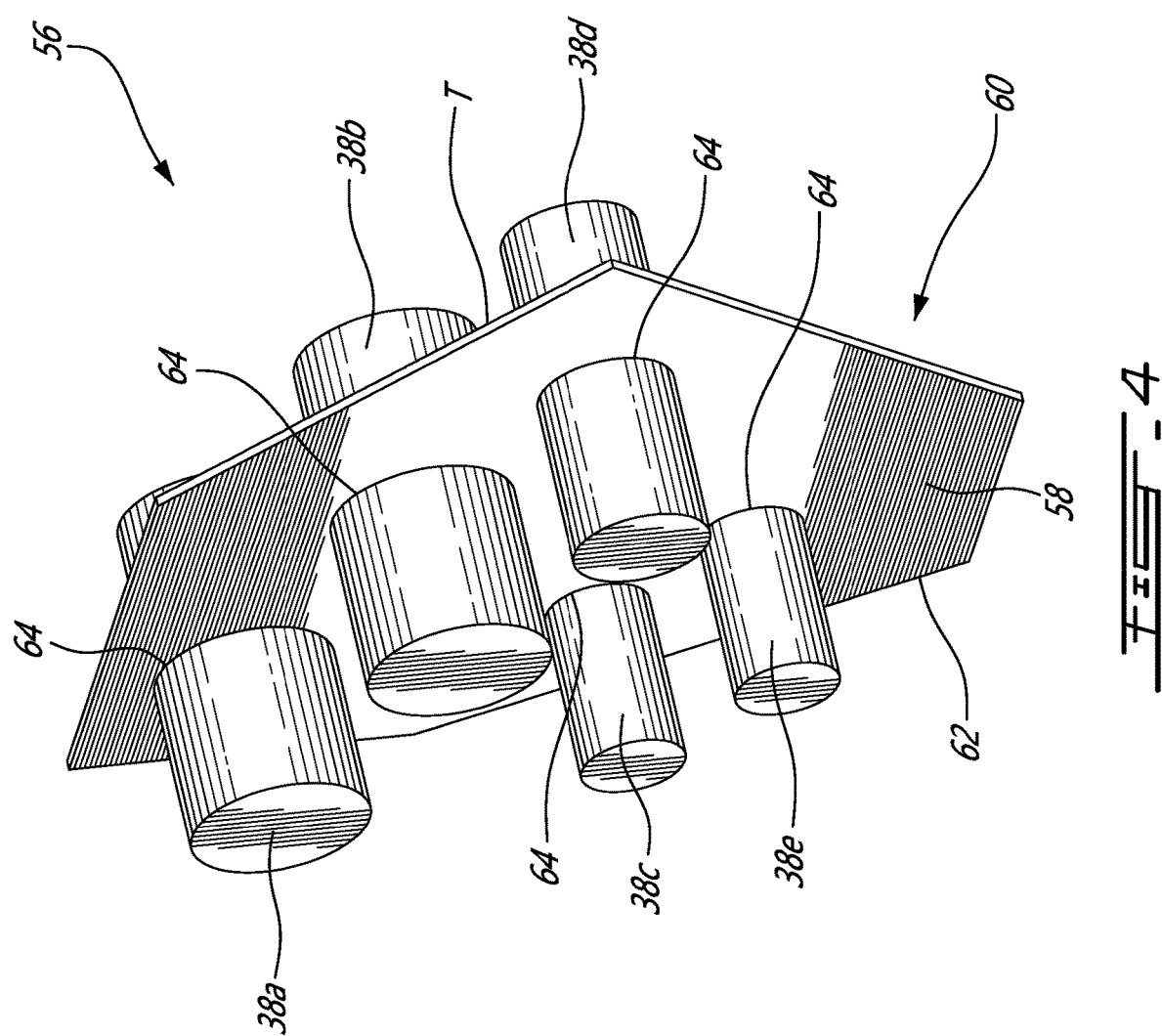

ACCESSORY GEARBOX COVER WITH PLANAR LINKING MEMBER

TECHNICAL FIELD

The disclosure relates generally to aircraft engines and, more particularly, to accessory gearboxes of such engines.

BACKGROUND

Aircraft engines often include accessory gearboxes (AGBs), which are used to drive various engine accessories. Such engine accessories may be mounted to a cover of the AGB. AGB covers are often thin, relatively light, structures, on which a number of heavier masses (i.e., the accessories) are attached. AGB covers are therefore prone to dynamic vibrations and/or resonances during operation of the engine. In addition, certain accessories, such as generators, can induce additional vibrations in the AGB cover due to their own operating unbalances.

The frequencies generated by the vibrations and/or resonances can interfere with engine operating speeds and create structural concerns. However, weight and envelope constraints limit the changes that can be made to the AGB cover to shift the resonant frequencies.

SUMMARY

In one aspect, there is provided an accessory gearbox of an aircraft engine, comprising an accessory gearbox cover mounted to the accessory gearbox, the accessory gearbox cover defining a cover axis extending centrally therethrough and having an outer surface with accessory mounts disposed thereon, a first accessory device mounted to the accessory gearbox at a first mount of the accessory mounts, a second accessory device mounted to the accessory gearbox cover at a second mount of the accessory mounts, the second mount being spaced apart on the accessory gearbox cover from the first mount, and a planar linking member dynamically coupling the first accessory device to the second accessory device, the planar linking member extending transversally relative to the cover axis, the planar linking member having a first side opposite a second side, a first opening extending through the planar linking member from the first side to the second side, the first opening being aligned with the first accessory device and matingly receiving at least a portion of the first accessory device therethrough, the planar linking member having a second opening extending therethrough from the first side to the second side, the second opening being aligned with the second accessory device and matingly receiving at least a portion of the second accessory device therethrough, the planar linking member thereby mechanically interconnecting the first accessory device and the second accessory device independently from the accessory gearbox cover.

In another aspect, there is provided an aircraft engine, comprising a main shaft extending through a core of the aircraft engine, a tower shaft drivingly engaged to the main shaft at a first end of the tower shaft, and an accessory gearbox disposed outside of the core of the aircraft engine, the accessory gearbox drivingly engaged to the tower shaft at a second end thereof, the accessory gearbox comprising an accessory gearbox cover mounted to the accessory gearbox, the accessory gearbox cover defining a cover axis extending centrally therethrough and having an outer surface with accessory mounts disposed thereon, a first accessory device mounted to the accessory gearbox at a first mount of the accessory mounts, a second accessory device mounted to the accessory gearbox cover at a second mount of the accessory mounts, the second mount being spaced apart on the accessory gearbox cover from the first mount, and a planar linking member dynamically coupling the first accessory device to the second accessory device, the planar linking member extending transversally relative to the cover axis, the planar linking member having a first side opposite a second side, a first opening extending through the planar linking member from the first side to the second side, the first opening being aligned with the first accessory device and matingly receiving at least a portion of the first accessory device therethrough, the planar linking member having a second opening extending therethrough from the first side to the second side, the second opening being aligned with the second accessory device and matingly receiving at least a portion of the second accessory device therethrough, the planar linking member thereby mechanically interconnecting the first accessory device and the second accessory device independently from the accessory gearbox cover.

In a further aspect, there is provided a method for securing accessory devices to an accessory gearbox of an aircraft engine, comprising securing a first accessory of the accessory devices to a cover of the accessory gearbox at a first accessory mount disposed on an outer surface of the cover, securing a second accessory of the accessory devices to the cover of the accessory gearbox at a second accessory mount disposed on the outer surface of the cover, the second accessory mount spaced apart from the first accessory mount, and dynamically coupling the first accessory to the second accessory via a mechanical interconnection independent from the cover of the accessory gearbox, by securing a first opening of a planar linking member to the first accessory and securing a second opening of the planar linking member to the second accessory.

BRIEF DESCRIPTION OF THE DRAWINGS

Reference is now made to the accompanying figures in which:

FIG. 1 is a schematic cross sectional view of a gas turbine engine;

FIG. 2 is a perspective view of an accessory gearbox cover with a planar linking member between accessory devices;

FIG. 3 is a perspective view of a planar linking member for accessory devices, according to an embodiment; and FIG. 4 is a perspective view of the planar linking member of FIG. 3 with accessory devices linked thereby.

DETAILED DESCRIPTION

FIG. 1 illustrates an exemplary engine 10, such as a gas turbine engine for example, of a type preferably provided for use in an aircraft for subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A core casing 20 surrounds the compressor section 14, combustor 16, and turbine section 18. A housing or nacelle 22 surrounds the core casing 20 and defines an annular bypass passage 24 therebetween. A low pressure compressor of the compressor section 14 and a low pressure turbine of the turbine section 18 define a low pressure spool assembly 26. A high pressure compressor of the compressor section 14 and a high pressure turbine of the turbine section 18 define a high pressure spool assembly 28. While FIG. 1 illustratively depicts engine 10 to be a multi-spool, turbofan-type engine, the present disclosure is also applicable to other engine types, such as turboprop or turboshaft engines, having one or more spools. The present disclosure may also apply to other types of engines, such as hybrid-electric engines.

The engine 10 further includes an accessory gearbox 30 (also referred to as an accessory gearbox, or simply "AGB") which includes generally a housing 32 secured to a mounting face on either the nacelle 22 or the core casing 20. In the depicted embodiment of FIG. 1, the AGB 30 is mounted to the nacelle 22 and a tower shaft 34 is operatively connected (i.e., drivingly engaged) at one end thereof to one of the main shafts, for example a shaft of the high pressure spool assembly 28, and is operatively connected (i.e., drivingly engaged) at the other end thereof to the accessory gearbox 30, such as to drive the AGB. Illustratively, the tower shaft 34 and the accessory gearbox 30 form a mechanical drive system for transferring engine power to drive one or more accessories of the engine 10. Such accessories may include, for example, an integrated starter generator 36 and one or more other accessory devices indicated schematically at 38 in FIG. 1, such as a fuel pump, a hydraulic pump, etc.

In some embodiments, the housing 32 of the AGB 30 includes a cover (e.g., cover 40 illustrated in FIG. 2) to which one or more accessory devices (e.g., accessory device(s) 38 illustrated in FIG. 2), also referred to as accessories, are mounted. As illustrated in FIG. 2, a first accessory device 38a, a second accessory device 38b, and a third accessory device 38c (collectively referred to as accessory device(s) 38) are mounted to the cover 40. In other examples, a greater or lesser number of accessory device(s) 38 may be mounted to the cover 40. In particular, the cover 40 includes an inner surface and an outer surface 42. The outer surface 42 includes one or more accessory mounts 44 to which the accessory device(s) 38 is/are mounted. The accessory mounts 44 are spaced apart on the outer surface 42 of the cover 40, as required for the respective accessory device(s) 38 mounted thereto. As such, a first mount of the accessory mounts 44 will thus be spaced apart from a second mount of the accessory mounts 44, for example. Apertures 46 may pass through the accessory mounts 44 and/or the cover 40 for one or more shafts (not shown) of the accessory device(s) 38 to pass through as well, as well as fastener holes 48 to secure the accessory device(s) 38 to the cover 40. Each accessory device 38a, 38b, 38c may thus be provided with suitable mounting hardware. The cover 40 includes other connectors 50, for instance for the attachment of fluid tubes. As shown in FIG. 2, the connectors 50 may or may not be threaded. The shown cover 40 has a flat and thin structure with a flange 52 along an outer circumference thereof. Other shapes for the cover 40 may be contemplated. The flange 52 illustratively includes fastener holes 54 disposed therethrough along its circumference for attaching the cover 40 to the housing 32 via fasteners (not shown). A cover axis A for the cover 40 is defined as extending centrally therethrough in a direction normal to the outer surface 42 of the cover 40.

As the accessory devices 38 are removably mountable to the cover 40, they may be removed and replaced, for instance for servicing. The accessory device(s) 38 may be referred to as overhung masses, as their relative weight compared to the cover 40 to which they are attached may render them prone to dynamic vibrations and/or resonances. In addition, the accessory device(s) 38 may include a generator, which may induce additional vibrations due to its own operating unbalances. Such vibrations may interfere with engine operations and create potential structural concerns, for instance excessive loading on engine components due to high vibration responses.

In accordance with the present technology, therefore, the accessory device(s) 38 are mechanically (i.e., structurally) secured to one another, via a planar linking member 56. This dynamic coupling of the accessory device(s) 38 (e.g., the first accessory device 38a coupled to the second accessory device 38b, etc.) improves the dynamic characteristics of the accessory gearbox cover 40. Stated differently, the accessory device(s) 38 are mechanically interconnected by the planar linking member 56 independently from the AGB cover 40. In the shown case, the planar linking member 56, also referred to as a linking membrane, extends transversally relative to the cover axis A and has a first side 58 opposite a second side 60 (see FIG. 4) and is delimited by edges 62. The planar linking member 56 includes openings 64 extending through the planar linking member 56 from the first side 58 to the second side 60 and sized to receive two or more accessory devices 38. In the depicted embodiment, each opening 64, also referred to as an aperture, is located radially inward from the edges 62 of the planar linking member 56 and defines a closed perimeter opening. As such, the accessory device 38 disposed within each closed-perimeter opening 64 may be operable to have its loads transferred by the planar linking member 56 in all directions parallel to the surfaces of the top and bottom sides 58, 60. In other cases, one or more openings 64 may be disposed along one of the edges 62, and may thus define a partially open perimeter. In such cases, the accessory device(s) 38 engaging with a partially open perimeter opening 64 may only be operable to have its loads transferred in some directions parallel to the surfaces of the top and bottom sides 58, 60. Various combinations of closed and partially open openings 64 may be contemplated.

In certain embodiments, planar linking member 56 operatively couples the first accessory device 38a, the second accessory device 38b, and the third accessory device 38c to each other, the first accessory device 38a, second accessory device 38b, and third accessory device 38c being received in respective openings 64. Other arrangements may be contemplated, for instance the planar linking member 56 only coupling some, but not all, of the accessory devices 38 to each other. Various shapes, sizes and materials may be selected for the planar linking member 56, as will be discussed in further detail below. It is understood that the surface of the planar linking member 56 may not always strictly planar or parallel, i.e., there may be some deflection in the first and second sides 58, 60, for instance due to the vibration of the accessory devices 38 and the planar linking member's 56 attachment points on the various accessory devices 38.

Referring to FIGS. 3 and 4, another planar linking member 56 is shown, illustratively operable to dynamically couple five accessory devices 38a-38e. Each opening 64 may be sized and shaped to correspond with a size and shape of a corresponding accessory device 38 so that a corresponding accessory device 38 may be snugly received in a given opening 64. Stated differently, the openings 64 are sized and shaped so that the planar linking member 56 may be aligned with the accessory devices 38 to matingly receive at least a portion thereof, illustratively placed or slipped over distal ends of the accessory devices 38 relative to the cover 40 of the AGB 30 in a secure manner so that loads and vibrations may be transferred from one accessory device 38 to another. In other cases, both the planar linking member 56, at the openings 64, and the accessory devices 38 may be provided with attachment means (e.g., fasteners) to secure the planar linking member 56 to the accessory devices 38. Illustratively, each of the accessory devices 38a-38e have circular cross-sections of varying diameters. As such, their corresponding openings each have circular shapes with diameters set to match, or slightly exceed to account for tolerances, the diameters of the corresponding accessory devices 38a-38e for simple installation, e.g. by press-fit. In other cases, one or more accessory devices may have other cross-sectional shapes, for instance square or irregular, and the corresponding openings may be correspondingly shaped accordingly.

In the shown case, the number of openings 64 corresponds to the number of accessory devices 38 mounted to the cover 40 (illustratively five openings 64 for the five accessory devices 38), so that all of the accessory devices 38 are coupled together. The planar linking member 56 is thus sized, i.e., with a great enough surface area of the first side 58 (and second side 60) to span all of the accessory devices 38. In other cases, only some of the accessory devices 38 may be coupled together via planar linking member 56. For instance, a planar linking member 56 may be sized to only be placeable over some of the accessory devices 38. Stated differently, a surface area of the first side 58 (or of the second side 60) of the planar linking member 56 may be less than the surface area occupied by all of the accessory devices 38 on the outer surface 42 of the cover 40. In other cases, one or more of the openings 64 may be sized to be larger than a cross-section of one or more of the accessory devices 38 so that the planar linking member 56 may be placed over one or more of the accessory devices 38 without operatively coupling to the one or more accessory devices 38. Stated differently, one or more openings 64 may be sized and shaped so that a given accessory device 38 may be received within a respective opening with clearances in every direction parallel to the first side 58 and second side 60. For instance, a heaviest of the accessory devices 38 may be linked to the lightest of the accessory devices 38 via planar linking member 56, as their vibrations would likely vary the most among accessory devices 38. In other cases, two or more of the heaviest or largest accessory devices 38 may be coupled together via planar linking member 56. Other combinations may be contemplated as well. The planar linking member 56 may include other apertures cut therethrough, for instance for passing through hoses or tubes. In some cases, one or more openings 64 may be sized to receive two or more adjacently-placed accessory devices 38.

The engine accessories 38 may thus be linked together to create structural bridges therebetween. As will be discussed in further detail below, the planar linking member 56 may be secured to various locations on the accessory devices 38, for instance closer or further from the outer surface 42 of the AGB cover 40 relative to the cover axis A in a direction normal thereto. In some cases, the planar linking member 56 may be positioned at a furthest axial distance from the AGB cover 40 along the cover axis A. Other locations on the accessory devices 38 may be contemplated as well. In some embodiments, the planar linking member 56 may be anchored or moulded to the cover 40 itself as well as to two or more of the accessory devices 38.

As illustrated and described above, two or more accessory devices 38 may be coupled together by the planar linking member 56. By securing or dynamically coupling the two or more accessory devices 38 together, their respective masses may be coupled as well. The number of accessory devices 38 coupled together by planar linking member 56 and the placement of the planar linking member 56 on each accessory device 38 (e.g., at a given distance from the AGB cover 40 along the cover axis A) may be selected in order to change the frequency response of the mounting assembly. Stated differently, by coupling one or more accessory devices 38 together, the vibrations of the coupled accessory devices 38 due to typical engine operations will be intimately linked and be at a different frequency than the vibration frequency of each vibrating accessory device 38 if left uncoupled. The vibration frequency of the coupled accessory devices 38 may thus be tuned, for instance via the and/or placement of link members 56, to avoid particular frequencies in order to reduce a load on the engine cover 40, for instance to avoid specific engine operating frequencies that may have harmful results. In addition, the planar linking member 56 may provide a damping effect between coupled accessory devices 38 to further reduce the overall load on the cover 40, as will be discussed in further detail below. In such cases, the planar linking member 56 may be referred to as a dampening plate. This damping effect may allow for an overall lighter assembly due to the reduction in loads on the cover 40, allowing for a lighter cover 40.

In some cases, the planar linking member 56 is made from a rigid material such as a metal (e.g., steel or aluminum, although other metals may be contemplated). In some cases, a rigid planar linking member 56 may include a gasket or seal configured assist in mating the planar linking member 56 to the accessory device(s) 38. In such cases, the gasket or seal may assist in securing the planar linking member 56 to the accessory device(s) 38. In some cases, the planar linking member 56 can include a flexible or elastomeric material and be made from a dampening material such as rubber, silicone, or textile, or from a corrugated shape. A flexible planar linking member 56 may provide a damping effect between accessories 38. In such cases, the planar linking member 56 may stretch as the accessory devices 38 vibrate, providing a damping effect. The stretching of the flexible material n some cases, the planar linking member 56 may be made from a fire-resistant or fire-retardant material, and may supplement or replace the existing fire shield or thermal insulation blanket of the engine 10.

A thickness T of the planar linking member 56, i.e., between the first side 58 and second side 60, may vary. For instance, the material of the planar linking member 56, the number, size and weight of the accessories 38 to be coupled by the planar linking member 56, and the magnitude of the vibrations to be tuned or dampened may affect a selected thickness T of the planar linking member 56. Other factors may play a role in determining a suitable thickness T as well, for instance whether the planar linking member 56 will be used as a fire shield for the engine 10.

According to the present disclosure, there is taught a method for securing accessory devices 38 to an accessory gearbox 30 of an aircraft engine 10. A first accessory 38 of the accessory devices 38 is to a cover 40 of the accessory gearbox 30 at a first accessory mount 44 disposed on an outer surface 42 of the cover 40. A second accessory 38 of the accessory devices 38 is secured to the cover 40 of the accessory gearbox 30 at a second accessory mount 44 disposed on the outer surface 42 of the cover 40, the second accessory mount 44 spaced apart from the first accessory mount 44. The first accessory 38 is dynamically coupled to the second accessory 38 via a mechanical interconnection independent from the accessory gearbox cover 40 by securing a first opening 64 of a planar linking member 56 to the first accessory 38 and securing a second opening 64 of the planar linking member 56 to the second accessory 38.

It can be appreciated from the foregoing that at least some embodiments have a planar linking member for operatively coupling two or more accessory devices mounted to an accessory gearbox cover together, thereby by allowing for an easy-to-install planar linking member that can tune and dampen vibrations as required.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An accessory gearbox of an aircraft engine, comprising:
an accessory gearbox cover mounted to the accessory gearbox, the accessory gearbox cover defining a cover axis extending centrally therethrough and having an outer surface with accessory mounts disposed thereon;
a first accessory device mounted to the accessory gearbox at a first mount of the accessory mounts;
a second accessory device mounted to the accessory gearbox cover at a second mount of the accessory mounts, the second mount being spaced apart on the accessory gearbox cover from the first mount; and
a planar linking member dynamically coupling the first accessory device to the second accessory device, the planar linking member extending transversally relative to the cover axis, the planar linking member having a first side opposite a second side, a first opening extending through the planar linking member from the first side to the second side, the first opening being aligned with the first accessory device and matingly receiving at least a portion of the first accessory device therethrough, the planar linking member having a second opening extending therethrough from the first side to the second side, the second opening being aligned with the second accessory device and matingly receiving at least a portion of the second accessory device therethrough, the planar linking member thereby mechanically interconnecting the first accessory device and the second accessory device independently from the accessory gearbox cover;
wherein the first opening is dimensioned to correspond to a cross-sectional shape of the first accessory device and the second opening is dimensioned to correspond to a cross-sectional shape of the second accessory device.

2. The accessory gearbox as defined in claim 1, wherein the planar linking member is secured to the first accessory device and the second accessory device at a furthest axial position along the first accessory device and the second accessory device from the accessory gearbox cover relative to the cover axis.

3. The accessory gearbox as defined in claim 1, further comprising a third accessory device mounted to the accessory gearbox at a third of the accessory mounts, wherein a heaviest of the first accessory device, the second accessory device and the third accessory device is dynamically coupled, via the planar linking member, to a lightest of the first accessory device, the second accessory device and the third accessory device.

4. The accessory gearbox as defined in claim 1, wherein one or more of the first opening and the second opening is disposed radially inwardly from edges of the planar linking member such that the one or more of the first opening and the second opening defines a closed perimeter opening.

5. The accessory gearbox as defined in claim 1, wherein the planar linking member is made of a fire-resistant material.

6. The accessory gearbox as defined in claim 1, further comprising a plurality of additional accessory devices mounted to a plurality of additional accessory mounts disposed on the outer surface of the accessory gearbox cover, wherein the planar linking member includes a number of additional openings less than the number of the plurality of additional accessory devices.

7. The accessory gearbox as defined in claim 1, further comprising a plurality of additional accessory devices mounted to a plurality of additional accessory mounts disposed on the outer surface of the accessory gearbox cover, wherein the planar linking member includes a plurality of additional openings and at least one of the plurality of additional openings is shaped to receive a corresponding one of the plurality of additional accessory devices with a clearance defined therebetween in a direction parallel to the first side and the second side.

8. The accessory gearbox as defined in claim 1, further comprising a plurality of additional accessory devices mounted to a plurality of additional accessory mounts disposed on the outer surface of the accessory gearbox cover, wherein the planar linking member includes a plurality of additional openings, and at least one of the plurality of additional openings is operable to engage with two adjacently mounted of the plurality of additional accessory devices.

9. The accessory gearbox as defined in claim 1, wherein the planar linking member is a dampening plate made of a flexible or elastomeric material.

10. An aircraft engine, comprising:
a main shaft extending through a core of the aircraft engine;
a tower shaft drivingly engaged to the main shaft at a first end of the tower shaft; and
an accessory gearbox disposed outside of the core of the aircraft engine, the accessory gearbox drivingly engaged to the tower shaft at a second end thereof, the accessory gearbox comprising an accessory gearbox cover mounted to the accessory gearbox, the accessory gearbox cover defining a cover axis extending centrally therethrough and having an outer surface with accessory mounts disposed thereon, a first accessory device mounted to the accessory gearbox at a first mount of the accessory mounts, a second accessory device mounted to the accessory gearbox cover at a second mount of the accessory mounts, the second mount being spaced apart on the accessory gearbox cover from the first mount, and a planar linking member dynamically coupling the first accessory device to the second accessory device, the planar linking member extending transversally relative to the cover axis, the planar linking member having a first side opposite a second side, a first opening extending through the planar linking member from the first side to the second side, the first opening being aligned with the first accessory device and matingly receiving at least a portion of the first accessory device therethrough, the planar linking member having a second opening extending therethrough from the first side to the second side, the second opening being aligned with the second accessory device and matingly receiving at least a portion of the second accessory device therethrough, the planar linking member thereby mechanically interconnecting the first accessory device and the second accessory device independently from the accessory gearbox cover, wherein the first opening is dimensioned to correspond to a cross-sectional shape of the first accessory device and the second opening is dimensioned to correspond to a cross-sectional shape of the second accessory device.

11. The aircraft engine as defined in claim 10, wherein the planar linking member is secured to the first accessory device and the second accessory device at a furthest axial position along the first accessory device and the second accessory device from the accessory gearbox cover relative to the cover axis.

12. The aircraft engine as defined in claim 10, further comprising a third accessory device mounted to the accessory gearbox at a third of the accessory mounts, wherein a heaviest of the first accessory device, the second accessory device and the third accessory device is dynamically coupled, via the planar linking member, to a lightest of the first accessory device, the second accessory device and the third accessory device.

13. The aircraft engine as defined in claim 10, wherein one or more of the first opening and the second opening is disposed radially inwardly from edges of the planar linking member such that the one or more of the first opening and the second opening define a closed perimeter opening.

14. The aircraft engine as defined in claim 10, further comprising a plurality of additional accessory devices mounted to a plurality of additional accessory mounts disposed on the outer surface of the accessory gearbox cover, wherein the planar linking member includes a number of additional openings less than the number of the plurality of additional accessory devices.

15. The aircraft engine as defined in claim 10, further comprising a plurality of additional accessory devices mounted to a plurality of additional accessory mounts disposed on the outer surface of the accessory gearbox cover, wherein the planar linking members includes a plurality of additional openings, and at least one of the plurality of additional openings is shaped to receive a corresponding one of the plurality of additional accessory devices with a clearance defined therebetween in a direction parallel to the first side and the second side.

16. The aircraft engine as defined in claim 10, further comprising a plurality of additional accessory devices mounted to a plurality of additional accessory mounts disposed on the outer surface of the accessory gearbox cover, wherein the planar linking member includes a plurality of additional openings, and at least one of the plurality of additional openings is operable to engage with two adjacently mounted of the plurality of additional accessory devices.

17. A method for securing accessory devices to an accessory gearbox of an aircraft engine, comprising:
 securing a first accessory of the accessory devices to a cover of the accessory gearbox at a first accessory mount disposed on an outer surface of the cover;
 securing a second accessory of the accessory devices to the cover of the accessory gearbox at a second accessory mount disposed on the outer surface of the cover, the second accessory mount spaced apart from the first accessory mount; and
 dynamically coupling the first accessory to the second accessory via a mechanical interconnection independent from the cover of the accessory gearbox, by securing a first opening of a planar linking member to the first accessory and securing a second opening of the planar linking member to the second accessory, said dynamically coupling the first accessory to the second accessory further including removably slipping the first opening of the planar linking member over a distal end of the first accessory relative to the cover of the accessory gearbox, and slipping the second opening of the planar linking member over a distal end of the second accessory.

\* \* \* \* \*